UNITED STATES PATENT OFFICE.

AUSTIN G. DAY, OF NEW YORK, N. Y.

IMPROVEMENT IN THE MANUFACTURE OF KERITE.

Specification forming part of Letters Patent No. 210,409, dated December 3, 1878; application filed March 8, 1877.

CASE C.

*To all whom it may concern:*

Be it known that I, AUSTIN G. DAY, of the State, county, and city of New York, have invented a process of making a new vulcanized product composed of a combination of natural india-rubber and the compound termed "artificial caoutchouc," or "kerite," described in Letters Patent of the United States issued to me therefor of even date herewith; and I hereby declare that the following is a full, clear, and exact description of the said process.

The object of this invention is to provide a product which shall cost very much less than the ordinary india-rubber compounds formed exclusively, or almost exclusively, of natural caoutchouc vulcanized, and which shall at the same time be well adapted to take the place of the latter in the arts.

The ingredients which are essential to this process are india-rubber, crude kerite, and sulphur.

To enable those skilled in the manufacture of india-rubber articles to put my invention into practice, I will proceed to describe the manner in which it may be carried out.

The proportions in which the natural rubber and the crude kerite may be combined will admit of a wide variation; but to make a good product, I may sometimes take, say, about twenty pounds of Para rubber, one pound sulphur, and five pounds litharge, which should first be well mixed together on steam-grinders in the way well known to india-rubber workers. I then take, say, twenty to forty pounds of the crude kerite which has been made according to my above-mentioned Letters Patent and grind it on the rolls until it is warm. When thus prepared I mix it with the rubber in the usual manner and grind the mass fine.

In this condition it is ready to be made into the articles for which it is to be used, and it is then vulcanized in the same way as ordinary india-rubber compounds are. The heat which I frequently employ for this purpose is run during three to four hours up to about 275° to 280° Fahrenheit, in the well-known manner; but other temperatures and other lengths of heating times may be adopted.

As stated above, no particular proportions of the materials are essential, and the relative amounts of each of them may be largely varied without departing from my invention.

If desired, as much as three pounds of the crude kerite may be employed to one pound of rubber, and one pound to one and one-half pound of sulphur to twenty pounds of rubber.

The determination of the proportions will generally depend upon the particular class of goods to be manufactured, such as shoes, belting, packing, hose, covering for telegraph-wire, clothing, &c.; and they may be increased or diminished relatively to each other to meet all these uses, as well as a great variety of others. In practice, each manufacturer would adopt such proportions of rubber, crude kerite, and the other ingredients used with them as would best suit the articles and grades of articles made by him.

Litharge is an assistant in this process, as it is in the vulcanization of ordinary india-rubber compounds; and the oxides and carbonates of many of the metals, as well as some of the earths, such as chalk and magnesia, may be used, when desired, in the way and for the purposes familiar to india-rubber manufacturers; but none of these substances are essential.

The product which results from this invention is the subject-matter of Case D, of even date herewith.

Having thus made known my invention, what I claim, and desire to secure by Letters Patent, is—

The within-described process of making a vulcanized product by combining crude kerite or artificial caoutchouc with natural india-rubber, substantially in the manner and for the purposes set forth.

AUSTIN G. DAY.

Witnesses:
A. J. DE LACY,
JOHN J. DIXON.